US007532382B2

(12) United States Patent
Izumi et al.

(10) Patent No.: US 7,532,382 B2
(45) Date of Patent: May 12, 2009

(54) DISPLAY ELEMENT

(75) Inventors: Tomoo Izumi, Toyonaka (JP); Akira Kosaka, Yao (JP); Mitsuhiro Fukuda, Chofu (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 159 days.

(21) Appl. No.: 11/809,413

(22) Filed: Jun. 1, 2007

(65) Prior Publication Data

US 2008/0024854 A1   Jan. 31, 2008

(30) Foreign Application Priority Data

Jun. 7, 2006   (JP)   ............................ 2006-158307

(51) Int. Cl.
*G02F 1/03* (2006.01)
*G02F 1/29* (2006.01)
*G02F 1/00* (2006.01)

(52) U.S. Cl. ...................... 359/245; 359/244; 359/248; 359/315; 359/322; 428/213; 349/46; 349/106

(58) Field of Classification Search .................. 359/242, 359/244, 245, 247, 248, 254, 315; 349/21, 349/42, 43, 46, 64, 84, 106, 107, 110, 96, 349/114, 127, 130, 139, 148; 345/173, 206; 315/169.3; 313/310, 503, 504, 506; 257/89, 257/98, 291, 431, 437; 428/212–214, 690; 438/29, 30, 161

See application file for complete search history.

(56) References Cited

U.S. PATENT DOCUMENTS

| 5,101,293 | A | * | 3/1992 | Kemeny | ..................... 359/254 |
| 6,198,225 | B1 | * | 3/2001 | Kano et al. | ............... 315/169.3 |
| 6,569,516 | B1 | * | 5/2003 | Nakamura et al. | .......... 428/212 |
| 6,727,566 | B1 | * | 4/2004 | Fukui et al. | .................. 257/437 |
| 6,958,748 | B1 | * | 10/2005 | Fukui et al. | .................. 345/173 |
| 7,206,112 | B2 | * | 4/2007 | Yoshizawa et al. | .......... 359/244 |
| 7,292,288 | B2 | * | 11/2007 | Kawasaki | ..................... 349/46 |

FOREIGN PATENT DOCUMENTS

JP   5-134266 A   5/1993

OTHER PUBLICATIONS

Oguchi et al, "A Study of Electrostatically Drive Display Device" Precision Engineering Laboratory, Tokyo Istitute of Technologies, Apr. 1, 2006, http://www.pme/pi.titech.ac.jp/research/old/display/display.htm, 2 pages; Together with an English-language translation thereof (4 pages).

Y. Kato et al, "A Flexible, Lightweight Braille Sheet Display with Plastic Actuators Driven by An Organic Field-Effect Transistor Active Matrix", IEEE International Electron Devices Meeting, Washington, DC, Dec. 5, 2005, #5.1, pp. 105-108.

* cited by examiner

*Primary Examiner*—Loha Ben
(74) *Attorney, Agent, or Firm*—Sidley Austin LLP

(57) ABSTRACT

The present invention provides a display element including a layered body. The layered body includes a layered portion comprising a plurality of transparent thin films with different refractive indexes, and a plurality of electrodes which are adapted to apply an electric field to each of the plurality of transparent thin films. Each of the plurality of transparent thin films comprises a material whose thickness changes according to the electric field.

8 Claims, 6 Drawing Sheets

DISPLAY ELEMENT

This application is based on Japanese Patent Application No. 2006-158307 filed on Jun. 7, 2006, in Japanese Patent Office, the entire content of which is hereby incorporated by reference.

TECHNICAL FIELD

The present invention relates to a display element provided with a layered plurality of transparent thin films having different refractive indexes to reflect or transmit the light in a specific wavelength range.

BACKGROUND

In recent years, various types of display apparatuses have been developed to display two-dimensional information such as a digitized image. In an often used method, using a form of the display wherein a great number of display elements are arranged in a two-dimensional array, a display element is made to correspond to each of the pixels constituting the two-dimensional information to be displayed. In response to each pixel value, an electric signal is sent for drive and display.

Thus, each display element is required to provide a quick response necessary for display based on an adequate drive signal, and to be capable of being produced in a downsized configuration to maintain the overall quality (including resolution). It is also required to provide high density arrangement and a large screen display without involving manufacturing difficulties or high costs.

In the meantime, the conventional color display element has required to three sub-pixels corresponding to R, G and B for color display using the primary colors of R, G and B (red-green-blue). To be more specific, it has been required that three display elements are arranged side by side in order to represent one original pixel. This involved a problem of a low aperture ratio, namely, a smaller display area rate per area occupied by a pixel, and poorer display efficiency of each of the R, G and B.

Thus, what was desired was the capability of displaying any one of the R, G and B colors, not the capability of displaying an independent display element in one color. To meet this requirement, a technique as disclosed in for example the following documents was developed to ensure that the colors that could be displayed by the independent display element is variable, without deteriorating the aforementioned required performances:

Unexamined Japanese Patent Application Publication (JP-A) No. H5-134266; and

Oguchi and Hatsuzawa "A Study of Electrostatically driven display device" (online), Apr. 1, 2006, Precision Engineering Laboratory, Tokyo Institute of Technologies, (Searched on Apr. 28, 2006), Internet <URL: http://www.pme.pi.titech.ac.jp/research/old/display/display.htm>.

In one of the methods for displaying a desired color of the R, G and B by one pixel, viz., by an independent display element, a chiral nematic liquid crystal is layered in three layers. To be more specific, without using the side-by-side arrangement, the RGB colors are displayed using stacked three layers, whereby a desired color of the R, G and B is displayed by one pixel.

However, since a plurality of substrates are to be utilized, this method involves a problem of the manufacturing process becoming complicated. Further, to display a high definition image, a film substrate or thin glass plate must be utilized from the viewpoint of parallax. These difficulties have not been overcome.

A solution to this problem is the technique of display element proposed in the first document (JP-A H5-134266), whereby a plurality of thin films having different refractive indexes are sandwiched by a pair of electrodes, and voltage is applied, so that the refractive index of the liquid crystal layer is changed and a desired color of R, G and B is displayed by one pixel. In this technique, a plurality of thin films having different refractive indexes are used as an optical interference filter. The refractive index is changed by an electric field, whereby the reflection wavelength or transmission wavelength by an interference filter is changed, and the displayed color is changed.

However, in this method, a high-fluidity liquid crystal film must be formed to a thickness of about 100 nm in order to perform the function of an interference filter. This involves difficulties in the manufacturing process and is not suited for formation of a large-area display element in particular.

According to the technique proposed in the second document, there is provided the display element formed by layering a micromachined half mirror and fixed mirror (silicon substrates) through gaps. In the display element, a half mirror support section is driven by an actuator whereby the distance between the half mirror and fixed mirror is changed, and a desired color of the R, G and B is displayed by one pixel. This is an attempt to pick up only the light with a wavelength corresponding to space between the mirrors using the resonance of light between mirrors (Fizeau interferometer).

This method is effective in that the displayed color is changed using the actuator driven by an electric signal. However, it requires use of actuators in at least two positions to drive the mirror for each pixel. Difficulties are found in high density arrangement of minute pixels and in the production of a high definition display element.

In the technique proposed in the following document, minute actuators arranged flatly on the sheet, which is not a color display element, are adhered to an organic transistor arrangement. When they are driven, the actuators (benders) are displaced independently from each other, and display in braille is given in real time: Kato, Iba, Sekitani, Noguchi, Hizu, "A Flexible, Lightweight Braille Sheet Display with Plastic Actuators Driven by An Organic Field-Effect Transistor Active Matrix", IEEE International Electron Devices Meeting, Washington, D.C., Dec. 5-7, 2005, #5.1, pp. 105-108.

This method of using actuators may be used for color display and change of the displayed color. However, as can been seen from the fact that a bent type actuator is used to gain the amount of displacement, this method has a limit of its own and production of a high-definition display element is difficult.

As described above, various problems are involved in the method of displaying a desired color of R, G and B by an independent display element. These problems are exemplified by restrictions on the constituent elements, manufacturing difficulties, limited resolution, difficulties in producing a high-definition product and problems with increased area.

SUMMARY

In view of the aforementioned problems, the present invention provides a display element in a simple structure without manufacturing difficulties, which can easily be downsized and integrated so as to construct large-area display, and enables quick and variable control of a color display by an independent display element.

According to various embodiments, there is provided a display element comprising a layered body. The layered body comprises a layered portion comprising a plurality of transparent thin films with different refractive indexes, and a plurality of electrodes which are adapted to apply an electric field to each of the plurality of transparent thin films. Each of the plurality of transparent thin films comprises a material whose thickness changes according to the electric field.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

The following describes the embodiment of the present invention with respect to drawings.

Structure of Display Element 1

Figure 1:
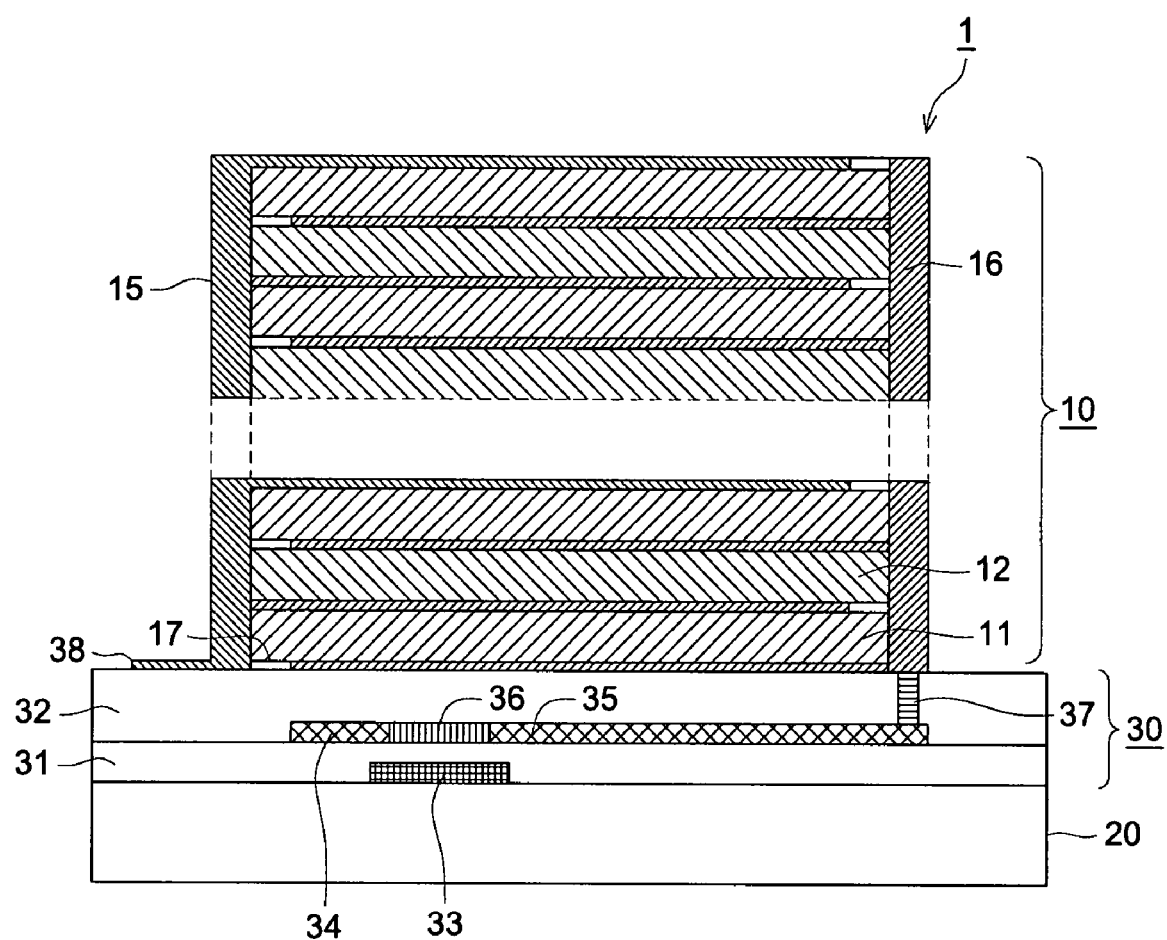
FIG. 1 is a cross sectional view representing a schematic structure of a display element 1 as a first embodiment.

Referring to FIG. 1, the following describes the structure of the display element 1. FIG. 1 is a cross sectional view representing a schematic structure of a display element. An independent display element is shown in FIG. 1. Generally, however, a great number of display elements are arrayed in two-dimensional arrangement and are used, for example, for two-dimensional display of an image, as will be described later.

In FIG. 1, there is provided a display element 1 which is composed of a TFT (thin film transistor) element 30 formed on a substrate 20 as a support member, and a layered body 10 formed on the TFT element 30.

In the layered body 10, the followings are layered as shown in FIG. 1: the transparent thin films made of two types of materials which are deformable by an electric field and have different refractive indexes, which is a first transparent thin film 11 and second transparent thin film 12; and a pair of electrodes for applying an electric field to the transparent thin films, which is a first electrode 15 and a second electrode 16.

The layered body 10 has the following layer structure.

A layer of the first transparent thin film 11 and a layer of the second transparent thin film 12 are layered one on top of the other to form a layered portion. Ten or more of the layered portions are repeatedly layered. A layer of the first electrode 15 and a layer of the second electrode 16 are alternately inserted in the interfaces between the first transparent thin films 11 and second transparent thin films 12. In other words, each of one layer of the first transparent thin film 11 and one layer of the second transparent thin film 12 is alternately inserted between the layer of the first electrode 15 and that of the second electrode 16. Accordingly, by providing a plurality of electrodes each of which is arranged in the layered body with sandwiching each of the plurality of transparent thin films, it ensures efficient application of an electric field to the layered portion including the aforementioned transparent thin films.

The first and second transparent thin films are made of organic polymers, and have refractive indexes of N1 and N2, and thicknesses of T1 and T2, respectively. They serve as actuators driven by an electric field. The thicknesses of these transparent thin films change according to the electric field, whereby the operation as a display element is performed. This will be described later.

To apply an electric field to the layered portion of the transparent thin film, the first and second electrodes which are conductive organic thin films are arranged at the interfaces of the transparent thin films through an insulation portion 17 in-between so as to avoid mutual electrical conduction, as described above. One of the electrodes is connected to a common electrode 38, while the other connected to the drain electrode 35 of the TFT element 30 for drive, as will be described later.

The following describes the structure of the TFT element 30.

A gate electrode 33 is arranged on part of the substrate 20. The gate electrode 33 is covered with the gate insulation film 31. Sandwiching the gate insulation film 31 in-between, a semiconductor section 36 is provided at a position corresponding to the gate electrode 33. A source electrode 34 and drain electrode 35 are arranged on the gate insulation film 31, and the aforementioned semiconductor section 36 is used to connect them together. To be more specific, when a signal voltage is applied to the gate electrode 33, electric conduction to the semiconductor section 36 is established, and the potential to be applied to the source electrode 34 is applied to the drain electrode 35.

The source electrode 34, semiconductor section 36 and drain electrode 35 are covered with a passivation layer 32. The passivation layer 32 is provided with a contact hole 37, and the drain electrode 35 is electrically connected with the second electrode 16. Further, a common electrode 38 is provided on the passivation layer 32, and is also electrically connected with the first electrode 15. To be more specific, when a signal voltage is applied to the gate electrode 33, the voltage to be applied between the common electrode 38 and source electrode 35 is applied between the first electrode 15 and second electrode 16. To be more specific, it is applied to the layers of the first transparent thin film 11 and second transparent thin film 12, whereby the film thickness is changed.

Structure of Display Element 2

Figure 2:
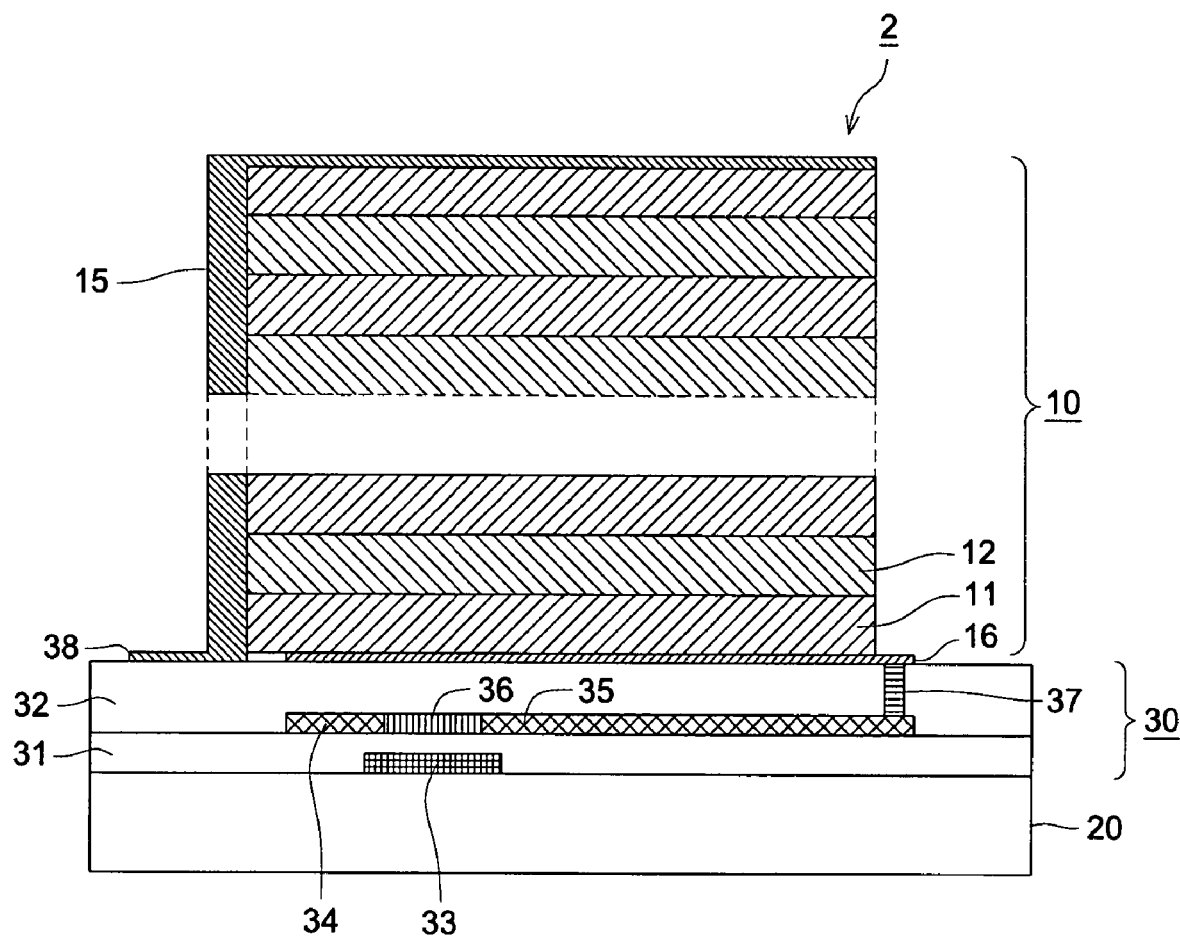
FIG. 2 is a cross sectional view representing a schematic structure of a display element 2 as a second embodiment.

Referring to FIG. 2, the following describes the structure of the display element 2 as a second embodiment.

FIG. 2 is a cross sectional view representing a schematic structure of a display element 2. Similarly to the case of the display element 1, an independent display element is shown in FIG. 2. Generally, however, a great number of display elements are arrayed in two-dimensional arrangement, as will be described later.

In FIG. 2, there is provided a display element 2 which is composed of a TFT element 30 formed on the substrate 20 as a supporting member, and a layered body 10 formed thereon.

In the layered body 10, the followings are layered as shown in FIG. 2: the transparent thin films made of two types of materials which are deformable by an electric field and have different refractive indexes, which is a first transparent thin film 11 and second transparent thin film 12; and a pair of electrodes for applying an electric field to the transparent thin films, which is a first electrode 15 and a second electrode 16.

The layered body 10 is different from that of the display element 1 and has the following layer structure.

A layers of the first transparent thin film 11 and a layer of the second transparent thin film 12 are layered one on top of the other to form a layered portion. Ten or more of the layered portions are repeatedly layered. This is the same as the display element 1. However, the difference is that neither the layers of the first electrode 15 or those of the second electrode 16 are not inserted in the interface between the first transparent thin film 11 and second transparent thin film 12. One layer of the first electrode 15 and one layer of the second electrode 16 are provided on the uppermost end and the lowermost end of the layered body formed of a layered portion of the transparent thin film, respectively. The entire layer of the transparent thin films is sandwiched between a pair of the layer of the first electrode 15 and that of the second electrode 16.

The first and second transparent thin films are made of organic polymers, and have refractive indexes N1 and N2 and thicknesses T1 and T2, respectively. They work as actuators driven by the electric field, similarly to the case of the display element 1. The only difference is how the electric field is applied. The thicknesses of these transparent thin films change according to the electric field, whereby the operation as a display element is performed. This will be described later.

As described above, to apply an electric field to the layered portion of the transparent thin film, the first and second electrodes which are conductive organic thin films are arranged on the upper and lower ends of the entire transparent thin film so as to avoid mutual electrical conduction. One of the electrodes is connected to a common electrode 38 of the TFT element 30 for drive, while the other connected to the drain electrode 35. This structure is the same as that in the display element 1. The structure of the TFT element 30 is the same as that in the display element 1, and description will be omitted.

Drive of Display Element

Figure 3:
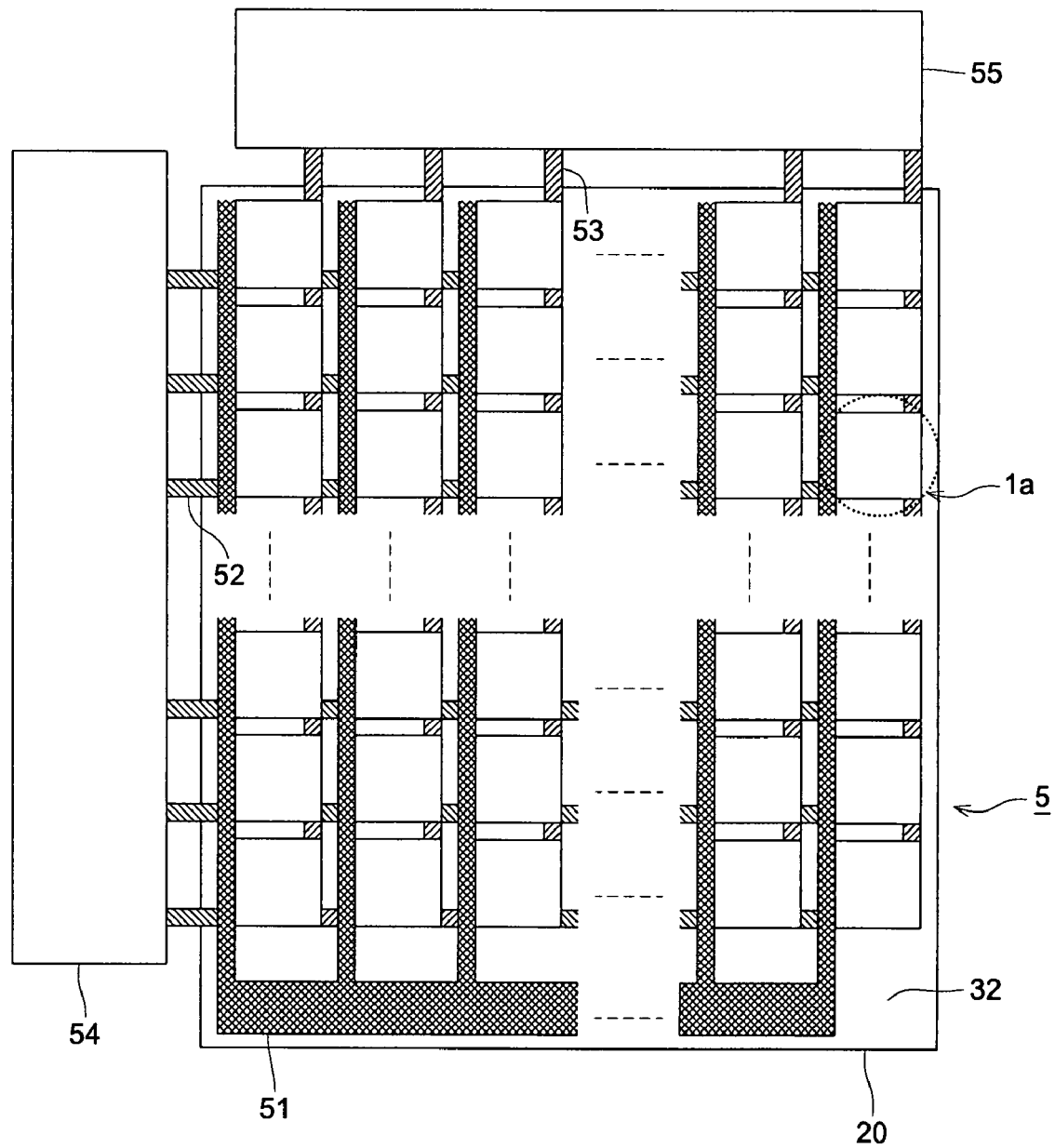
FIG. 3 is a drawing showing the two-dimensional arrangement of a display element and a drive circuit of the display element in conformity thereto.

FIG. 3 is a drawing showing the two-dimensional arrangement of a display element and a drive circuit of the display element in conformity thereto. Referring to FIG. 3, the following describes the drive of the display element arrangement.

In FIG. 3, there are provided display elements 1a each corresponds to the independent display element shown in FIGS. 1 and 2. It is shown in a top view, not in a cross sectional view. A plurality of display elements are arranged flatly as shown in FIG. 3, whereby a display element array 5 is structured. There are various methods for arrangement and corresponding drive operation, without the present invention being restricted thereto.

These arrangements are formed integrally on the common substrate 20 in the form of a drive circuit or wiring. Although they are not illustrated one by one, those that can be standardized as a display element such as a common electrode 38 for formation of the TFT element 30 are collectively wired. Signals to the gate electrode 33 and source electrode 34 can be driven according to matrix in response to the arrangement. Further, the layered bodies 10 which are two-dimensionally arranged are also independently formed and are controlled independently for each display element.

In FIG. 3, there is provided a common electrode 51, which is wired on the passivation layer 32 as illustrated. This allows connection with the first electrodes 15 of all the display elements, and permits a common potential to be supplied thereto. There is provided a signal bus line 53, which gives a signal potential to the second electrode 16 through the source electrode 34 of each display element. Whether or not the source electrode 34 gives a signal potential to the second electrode 16 is determined by the matrix drive in connection with the signal of the gate bus line 52.

What gives a signal to the gate bus line 52 is the driver IC 54 for gate. What gives a signal to the signal bus line 53 is the driver IC 55 for signal. Thus, each of the display elements is driven according to matrix by the combination of both signals to be outputted. To be more specific, the operation of applying an electric field to the layered body is determined for each display element. Thereby, an electric field is applied to each of the layered bodies which are two-dimensionally arranged by each of corresponding TFT elements independently of each other.

Change of Film Thickness and Operation of Display Element By Electric Field

The two-dimensionally arranged display element can be used as a display. In the present embodiment, a polymer thin film that can be deformed (change in film thickness) according to an electric field is used to function as an electric field drive actuator, whereby the wavelength of the reflection light or transmission light is optically changed. In other words, while conducting the wavelength selection as an interference filter, the thickness of the transparent thin film is controlled, whereby the selected wavelength itself can be changed.

Figure 4:
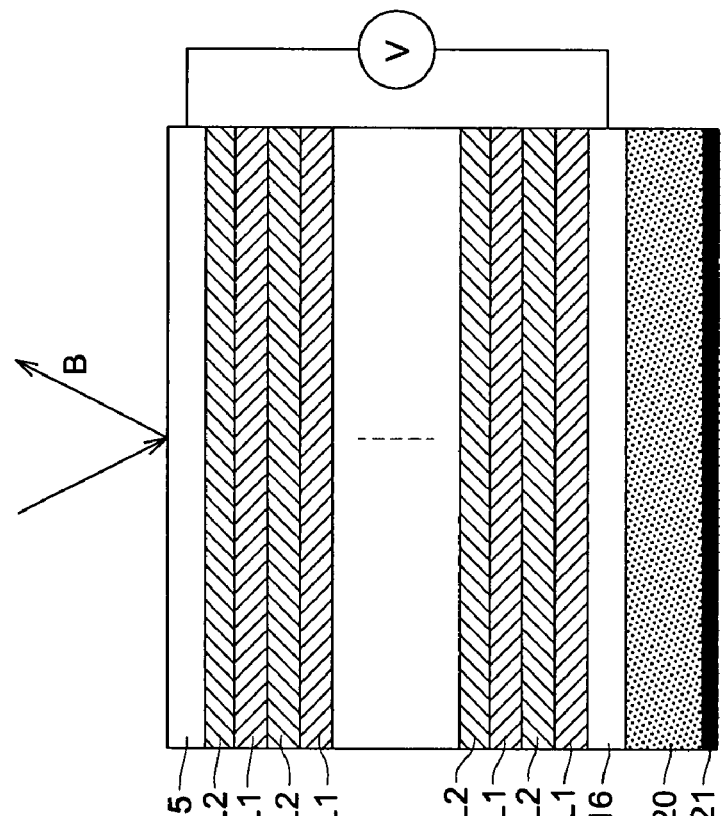
FIGS. 4(a) and 4(b) are the cross sectional views showing a reflection type display element when a voltage is applied and when not applied.
Figure 4:
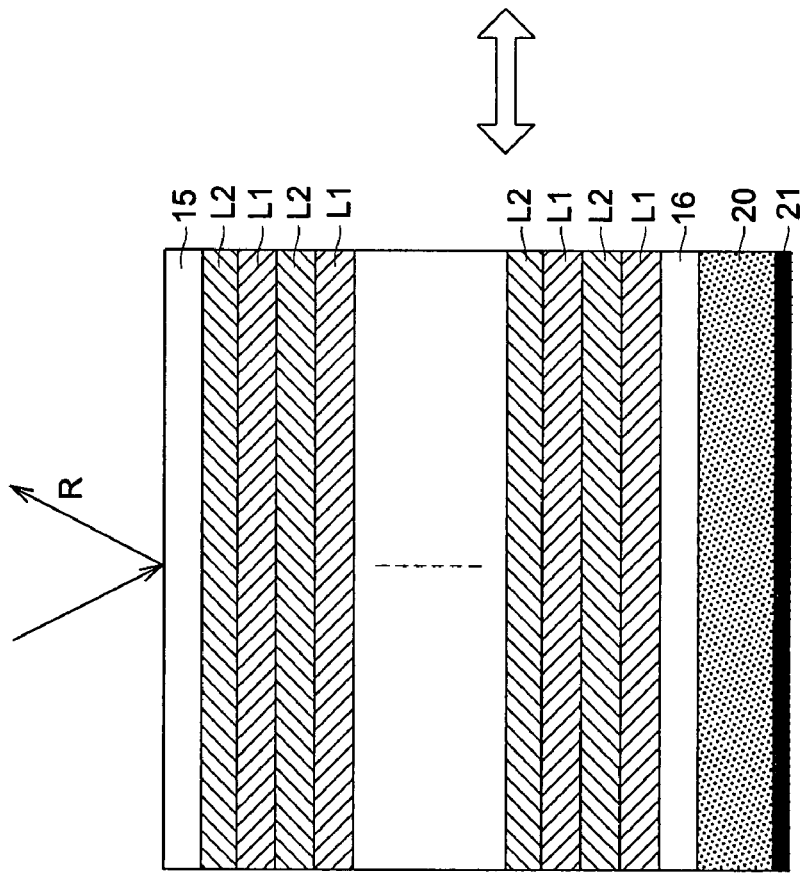

FIGS. 4(a) and 4(b) are the cross sectional view of a display element as a reflection type display element. The operation as a display element, namely, the drive by electric field and reflection characteristics will be described with reference to FIGS. 4(a) and 4(b).

FIG. 4(a) shows the cross sectional view wherein a voltage is applied and FIG. 4(b) shows the cross sectional view wherein voltage is not applied. To shows the operation principle, only the layered body 10 and substrate 20 are illustrated, while the driven electrode as display or wiring is not shown. The following describes the operations when a signal voltage is applied between the electrode 15 on the upper end and the electrode 16 on the lower end of the layered body, and when it is not applied.

In FIGS. 4(a) and 4(b), L1 and L2 indicate the first and second transparent thin films, and have the refractive indexes of 1.35 and 1.65, respectively. As illustrated, L1 and L2 are layered to constitute a layered portion, and ten layered portions are layered. The transparent conductive films 15 and 16 are formed on the upper and lower ends of the entire of the layered portions of the L1 and L2, to construct a layered body. The entire layered body 10 is formed on the glass substrate 20. A light absorbing layer 21 is provided on the surface opposite to the layered body on the glass substrate.

The aforementioned description refers to the case of reflection type display, wherein light enters to the display element from above, and the display element is observed from above. Transparent type display is also possible in the same manner.

Interference occurs between reflected beams of light when such thin layers having different refractive indexes are layered, and only the light with specifically selected wavelength is reflected. This is a well-known principle of an interference filter. When receiving light, the aforementioned layered body 10 functions according to the principle of this interference filter, and reflects only the light with specifically selected wavelength, whereby specific color is displayed.

For example, white light travels from above the display element, and the light enters into the layered body 10. A great number of layers of the L1 and L2 generates transmitted light and reflected light on their interfaces. Multiple reflections occurred on the interfaces of the multi-layer films having different refractive indexes, make light beams with different optical path lengths. By interfering the light beams with different optical path lengths each other, the light beam with specific wavelength in conformity to the difference in the optical path length is selected, and is transmitted or reflected by the layered body.

In FIG. 4(a), the light with longer wavelength indicated by "R" is reflected selectively when the white light enters into the layered body from above. In FIG. 4(a), the status of multiple reflections in the layered body 10 is not illustrated. As a result, the display element appears to display a red color.

In FIG. 4(b), an electric field is applied to the layered body 10 with respect to the display element of FIG. 4(a). The transparent thin films L1 and L2 are deformed by the operation of this electric field. In the FIG. 4(b), the transparent thin films L1 and L2 are contracted in the direction of thickness, in other words, the thickness is reduced.

Reduction in an optical path length is caused by the reduction in thickness, and the wavelength selected by the layered body as an interference filter is shortened. To be more specific, in FIG. 4(b), the light with shorter wavelength indicated by "B" is reflected selectively when the white light enters into the layered body from above. As a result, the display element appears to display a blue color.

As described above, the displayed color of the display element can be changed by the presence or absence of the electric field to be applied. In FIGS. 4(a) and 4(b), R (red) and B (blue) are shown. The light of G (green) with the intermediate wavelength can be reflected by changing the intensity of the electric field.

To ensure sufficient working of the function as an interference filter, the refractive indexes of transparent thin films are preferably different from one another, and at least two of the transparent thin films preferably have refractive indexes whose difference is 0.3 or more. Further, ten or more layered portions of the transparent thin films are preferably layered repeatedly. Since the reflection factor can be increased by proper selection of the difference in the refractive index and the number of layers, the visibility as a display element can be improved.

Figure 5:
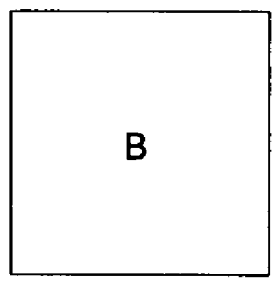
FIGS. 5(a) and 5(b) are the drawings showing the difference between the display element relating to the present invention and that of a conventional method, with reference to the display of three primary colors R, G and B using the display element.
Figure 5:
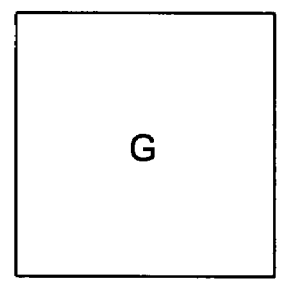
Figure 5:
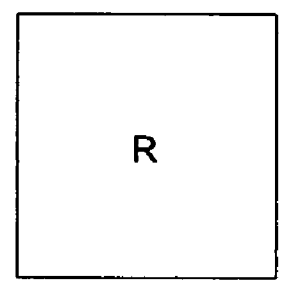
Figure 5:
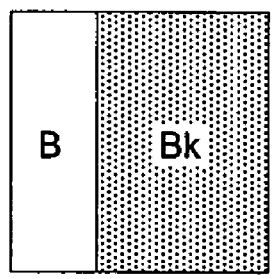
Figure 5:
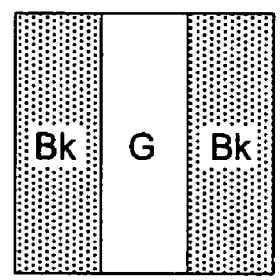
Figure 5:
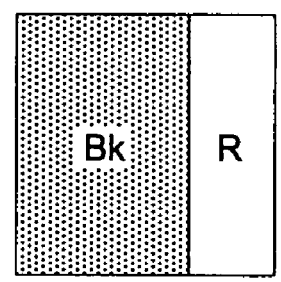

FIGS. 5(a) and 5(b) show the difference between the conventional display element (FIG. 5(b)) and the display element relating to the prevent invention (FIG. 5(a)), with reference to the display of three primary colors R, G and B using the display element. B, G and R indicate blue, green and red. The Bk indicates black, viz., colorless display. Display is given in three states, wherein B, G and R are shown in order from left to right.

In the conventional display element, only one color can be displayed in the independent display element. Accordingly, as shown in FIG. 5(b), three display elements for showing three colors of R, G and B were arranged flatly and any one of them is selectively displayed, whereby color display was provided. This arrangement has led to the poor efficiency of the color display per area as illustrated, and disadvantages in the reproduction of resolution.

As shown in FIG. 5(a), in the display element of this method according to the present embodiment, multiple color display is enabled by the independent display element, namely, by one pixel. To be more specific, when the selected wavelength of the interference filter is changed, display of any one of the colors RGB (red, green and blue) is enabled by one display element, according to an appropriate method of applying a signal.

As described above, the display element of the present invention allows display of any one of the colors for each element. This ensures excellent efficiency in color display and allows one element to be downsized, with the result that high resolution can be expected. Further, a large screen can be provided without manufacturing difficulties.

Material of Display Element

The following describes the members constituting the display element shown in FIGS. 1 and 2. The typical materials of the transparent thin film, insulation portion, electrode and substrate constituting the layered body 10 will be described.

Materials of various organic substances are known as the materials constituting the transparent thin films (11 and 12) that can be deformed. They are so-called high molecular actuators. When exposed to the electric field or other non-mechanical stimulus, these materials are subjected to such deformation as swelling, shrinkage and bending. Biologically soft movement of unprecedented sort can be achieved at a low energy, and attention of various industries is focused on this technology.

The above display element utilizes the expansion and contraction of material caused by electric field and known high molecular actuators can be used for the material. Preferred examples thereof include polyaniline, polypyrrole, polythiophene, polyvinylidene fluoride, and silicone rubber.

Various insulating materials are known as the materials for insulation portions (for example, insulation portions 31 and 17). The materials for insulation portions are not particularly restricted as long as they substantially do not conduct an electric current. Employed as the materials are polymers including polyimide, polyamide, polyester, polyacrylate, polyvinyl phenol, polyvinyl alcohol, and novolak resin; inorganic oxides and silicon nitride including silicon oxide, aluminum oxide, tantalum oxide, titanium oxide, tin oxide, and a vanadium oxide; inorganic nitrides including aluminium nitride; inorganic titanates including barium strontium titanate, barium zirconate titanate, lead zirconate titanate, and lead lanthanum titanate.

Various electrically conductive materials are known as the materials for electrodes (for example, electrodes 15 and 16). The materials for electrodes are not particularly restricted as long as they have conductivity being available on practical use. Examples thereof include platinum, gold, silver including silver paste, nickel, chromium, copper, iron, tin, antimony, lead, tantalum, indium, palladium, tellurium, rhenium, iridium, aluminum, ruthenium, germanium, molybdenum, tungsten, tin oxide-antimony, indium oxide-tin (ITO), fluorine-doped zinc oxide, zinc, carbon, lithium, beryllium, sodium, magnesium, potassium, calcium, scandium, titanium, manganese, zirconium, gallium, niobium, sodium-potassium alloy, magnesium/copper mixtures, magnesium/silver mixtures, magnesium/aluminum mixtures, magnesium/indium mixtures, aluminum/aluminum oxide mixtures, and lithium/aluminum mixtures. In these materials, carbon includes graphite, glassy carbon, and carbon paste.

Further, electrically conductive polymers are preferably used for electric conducting materials. Examples of electrically conductive polymers include polymers including the following component substances and a suitable additive which is added as needed, which can be used for electrically conductive polymers as long as they have conductivity being available on practical use: polyacethylene, polyaniline, polypyrrole, polythiophene, polyparaphenylene and polyethylenedioxythiophene (PEDOT), derivative thereof, analog thereof, monomers composing them, and oligomers composing them. Concretely, a complex of polyaniline and polystyrene sulfonic acid or carboxylic acid, and a complex of polyethylenedioxythiophene and polystyrene sulfonic acid or carboxylic acid, are preferably used.

Materials in which metal particles are dispersed are also used for the electrically conductive materials. As a material in which metal particles are dispersed, a known conductive paste can be used. The material in which metal particles are dispersed is preferably a material in which metal particles with a particle size of from 1 to 50 nm, and preferably from 1 to 10 nm. Materials for the metal particles include platinum, gold, silver, nickel, chromium, copper, iron, tin, antimony, lead, tantalum, indium, palladium, tellurium, rhenium, iridium, aluminum, ruthenium, germanium, molybdenum, tungsten, and zinc. An electrode is preferably formed from a material which is dispersed in a medium such as water or an arbitral organic solvent by using a dispersion stabilizer. Methods for preparing such metal particles for dispersion include a physical preparation method such as a gas evaporation method, a sputtering method, or a metallic vapor preparation method and a chemical preparation method such as a colloid method or a co-precipitation method in which metal ions are reduced in a liquid phase to produce metal particles.

The substrate 20 representing a support member can be a glass substrate, or a resin substrate. The materials for a glass substrate are not particularly restricted. However, general materials used for liquid. crystal displays can be used for the glass material. A plastic film sheet can be used for the resin substrate, for example. Examples of the plastic film include films comprising, for example, polyethylene terephthalate (PET), polyethylene naphthalate (PEN), polyethersulfone (PES), polyetherimide, polyether ether ketone, polyphenylene sulfide, polyallylate, polyimide, polycarbonate (PC), cellulose triacetate (TAC), or cellulose acetate propionate (CAP). Use of the plastic film makes it possible to decrease weight, to enhance portability, and to enhance durability against impact, as compared to glass.

EXAMPLES

Example 1

Reflection Type Display Element

In the structure shown in FIG. 2, a reflection type display element was manufactured and color display was performed by application of electric field. This example will be explained below. Reference will be made to FIGS. 2 and 3 wherever required.

The following describes the conditions wherein the organic TFT element was formed on the substrate.

A glass substrate with an ITO film formed on the surface to a thickness of 125 nm was used as a substrate. The glass substrate had a dimension of 200 mm×200 mm. A resist is formed on this substrate to a thickness of about 1 μm. First, the gate electrode and gate bus were provided through the processes of exposure, development and etching of an ITO film and separation of the resist. The photomask used in this process has the pattern to arrange a total of 100 TFTs (10×10) on the substrate.

Second, a 500 nm $SiO_2$ film was formed as a gate insulating film by the plasma CVD (chemical vapor deposition) using a TEOS (tetraethoxysilane) gas.

After cleaning, as a semiconductor material, an adequate amount of a solution obtained by dissolving poly(3-hexylthiophene) in chloroform at a concentration of 0.3% by mass was dropped onto the potion corresponding to the gate electrode on the insulation film according to the inkjet method.

Further, a source electrode and drain electrode were manufactured by dropping a proper amount of PEDOT (polyethylenedioxythiophene):PSS (Polystyrene Sulfonic Acid) according to the ink jet method.

After a passivation layer created by spin-coating an aqueous solution containing polyvinyl alcohol (PVA) has been formed, a contact hole was formed by photolithography. Carbon black was dropped in the hole and a second electrode was formed on the passivation layer using the same material in the area where a transparent thin film is to be formed.

The following describes the conditions for manufacturing the layered portion (actuator).

For a transparent thin film that could be deformed, a first solution obtained by dissolving a silicon resin in a solvent and a second solution obtained by dissolving vinylydene polyfluoride in a solvent were prepared so that each solution has a viscosity of about 10 Pa·s.

Then two types of printing stamps having a total of a hundred (10×10) convex portions (corresponding to pixels) of 15 mm×15 mm were prepared. Polydimethyl siloxane was used as the stamp material. It should be noted that use of a microcontact printing method is recommended to prepare minute pixels, although this was not used in the present Example.

The first and second solutions were alternately printed on the substrate to form layers of thin films. To evaporate the solvent after printing, printing was carried out on a hot plate having a temperature of 120° C. at an interval of about 30 seconds. After formation of each thin film, an adequate electric field was applied across the thickness so as to obtain an adequate level of electrostatic charge and polarization of the thin film.

The silicon resin and vinylydene polyfluoride were not mixed by printing under the aforementioned conditions. The silicon resin was formed into a thickness of 130 nm, and vinylydene polyfluoride was formed into a thickness of 100 nm.

After a single layer of each material was formed under the same printing conditions, refractive index was measured. The silicon resin had a refractive index of 1.65, while vinylydene polyfluoride had a refractive index of 1.35.

A layered body was formed by ten printing operations using both materials.

In the final phase, the first electrode was formed using PEDOT:PSS according to the inkjet method. The first electrode is electrically connected up to the upper surface of the passivation layer by dropping PEDOT:PSS on the side surface of the layered body as well. A common electrode was formed by electrically connecting the first electrodes of respective pixels on the passivation layer.

An electric field was applied to the prepared reflection type display element, whereby color display of reflected light was observed.

The aforementioned display element reflected light having a wavelength peak close to 700 nm when voltage was not applied. The reflection factor was 62%, and half-width of the wavelength distribution was 120 nm. A red color was observed in visual inspection.

When a 90-volt voltage was applied to the aforementioned display element, the display element reflected light having a wavelength peak close to 550 nm. The reflection factor was 64%, and half-width of the wavelength distribution was 120 nm. A green color was observed in visual inspection.

When a 180-volt voltage was applied to the aforementioned display element, the display element reflected light having a wavelength peak close to 430 nm. The reflection factor was 64%, and half-width of the wavelength distribution was 120 nm. A blue color was observed in visual inspection.

The above test has indicated that the optical path length, and hence, interference color were changed when voltage was applied.

Example 2

Transparent Type Display Element

A transparent type display element was manufactured using the structure shown in FIG. 2. The following describes an example of color display through application of electric field with reference to FIG. 2 wherever required.

The conditions for forming an organic TFT element on the substrate were the same as those wherein the reflection type display element was formed. However, the second electrode on the top surface of the passivation layer was formed by dropping PEDOT:PSS. In the reflection type display element, the second electrode was formed of carbon black, and was used also as a light absorbing layer. In the transparent type display element, the second electrode was required to be a transparent conductive film.

The conditions for forming a layered body (actuator) were the same as those wherein the reflection type display element was formed. The description will be omitted to avoid duplication.

An electric field was applied to the prepared transparent type display element and the color display was observed. Back light was emitted to the surface of the substrate opposite to the layered body and transmitted light was observed from the layered-body side.

The aforementioned display element transmitted light having a wavelength peak at about 450 through 550 nm when voltage was not applied. The transmitted light was a broad-spectrum light having a transmittance of 32% and a half-width of the wavelength distribution of 200 nm or more. A blue green color was observed in visual inspection.

When a 180-volt voltage was applied to the aforementioned display element, the aforementioned display element transmitted light having a wavelength peak at about 600 through 750 nm. The transmittance was 44% and the half-width of the wavelength distribution was 200 nm or more. A reddish orange color was observed in visual inspection.

The above test has indicated that the optical path length, and hence, interference color were changed when voltage was applied. Transmittance is lower than that of the reflection type display element. This is because the light absorption of the substrate and electrode, especially light absorption in the shorter wavelength, is greater.

Example 3

Pattern for Clock Display

Figure 6A:
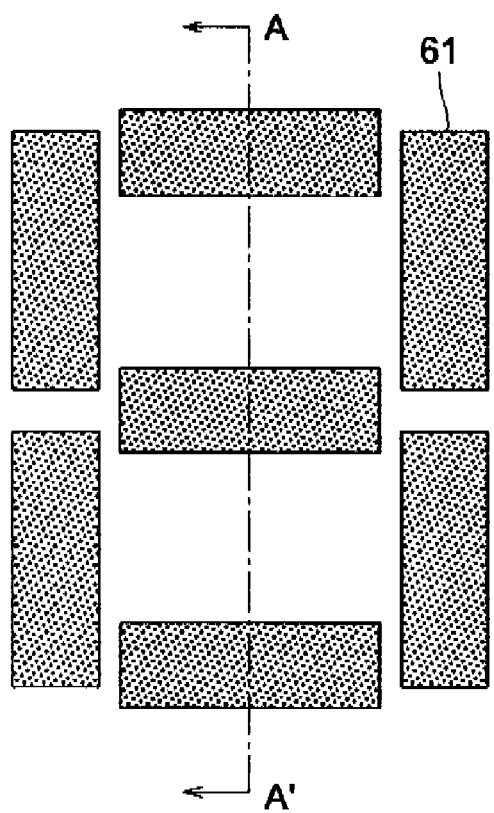
FIG. 6(a) is a drawing showing the arrangement pattern of the display element designed in a clock display pattern using seven display sections.
Figure 6B:
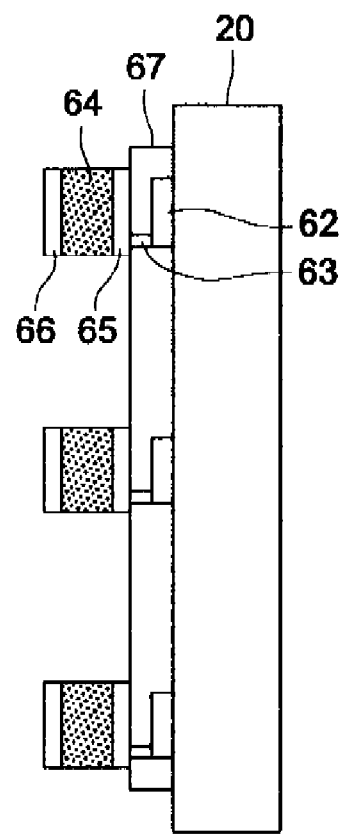
FIG. 6(b) is a cross sectional view thereof.

The structure of the layered body is the same as that of the aforementioned display element. The following describes an example showing manufacturing a display element having a clock display pattern based on seven display sections 61 shown in FIGS. 6(a) and 6(b), and its color display by application of an electric field. Reference will be made to FIG. 2 and FIGS. 6(a) and 6(b) as required.

FIG. 6(a) is a drawing showing the arrangement pattern of the display element and FIG. 6(b) is a cross sectional view taken along line AA'.

To manufacture the substrate, a drive electrode 62 was patterned on the glass substrate 20 equipped with a ITO (indium tin oxide). The drive electrode 62 is connected to the power source (not illustrated).

A passivation layer 67 was further formed on the substrate by coating an aqueous solution containing PVA coated by spin coating. After that, contact hole 63 was formed by laser. This allows the drive electrode 62 and second electrode 65 to be electrically connected.

The conditions for subsequent production of the layered body (actuator) are the same those of Example 1. There is provided the first and second electrode layers 65 and 66, and the layered portions 64 including the transparent thin films.

In the array of the aforementioned display element, seven display sections 61 each including the layered body were independently driven, and the status of the clock display was observed.

The level of the color display was the same as that in Example 1. Voltage was applied independently to seven display sections, and the status of the clock display was checked. As a result, the digits of 0 through 9, viz., the clock display pattern, was verified by visual observation.

As described above, according to the present embodiment, an electric field is applied to a layered body including a layered portion composed of a plurality of transparent thin films with different refractive indexes, and the thickness of each transparent thin film in the layered body is changed according to the electric field, in a display element. Thereby, the wavelength distribution of the reflected light or transmitted light is changed with respect to the incoming light. This procedure provides a display element in a simple structure without manufacturing difficulties, which can easily be downsized and integrated so as to construct large-area display, and which enables quick and variable control of a color display by an independent display element.

While the preferred embodiments of the present invention have been described using specific terms, such description is for illustrative purposes only, and it is to be understood that changes and variations may be made without departing from the spirit or scope of the appended claims.

In the present embodiment, for example, an organic substance was shown as a material of a transparent thin film whose thickness can be changed. However, an inorganic substance can be used on part of the layer, and the surface for observation can be provided on the back side of the substrate. This arrangement solves the problem of misalignment of the parallax resulting from extension and contraction of the transparent thin film. Further, in the present embodiment, the layered body is shown as a result of repeated layering of the layered portions composed of two layers having different refractive indexes, but three or more layers, instead of two layers, can be used for the layered portion, and the number of the layered portions repeatedly formed can be determined as desired.

What is claimed is:

1. A display element comprising:
   a layered body comprising
      a layered portion comprising a plurality of transparent thin films with different refractive indexes, and
      a plurality of electrodes which are adapted to apply an electric field to each of the plurality of transparent thin films, wherein each of the plurality of transparent thin films comprises a material whose thickness changes according to the electric field.

2. The display element of claim 1, wherein each of the plurality of transparent thin films is a polymer thin film.

3. The display element of claim 1, wherein at least two of the plurality of transparent thin films have refractive indexes whose difference is 0.3 or more.

4. The display element of claim 1, wherein the layered body comprises ten or more of the layered portions which are layered.

5. The display element of claim 1, wherein each of the plurality of electrodes is arranged in the layered body with sandwiching each of the plurality of transparent thin films.

6. The display element of claim 1, wherein each of the plurality of electrodes is a conductive organic thin film.

7. The display element of claim 1, wherein a plurality of the layered bodies are two-dimensionally arranged in the display element, and an electric field is applied to each of the layered bodies independently of each other.

8. The display element of claim 7, further comprising a plurality of TFT elements each of which being arranged corresponding to each of the layered bodies which are two-dimensionally arranged, wherein each of the plurality of TFT elements applies an electric field to the corresponding layered bodies independently of each other.

* * * * *